US007805507B2

(12) United States Patent  (10) Patent No.: US 7,805,507 B2
Markel et al.  (45) Date of Patent: Sep. 28, 2010

(54) USE OF URI-SPECIFICATIONS IN META-DATA DRIVEN INSTRUMENTATION

(75) Inventors: Arieh Markel, Broomfield, CO (US); Alexander G. Vul, Palo Alto, CA (US); Brandon Eugene Taylor, Longmont, CO (US); Peter H. Schow, Longmont, CO (US)

(73) Assignee: Oracle America, Inc., Redwood City, CA (US)

( * ) Notice: Subject to any disclaimer, the term of this patent is extended or adjusted under 35 U.S.C. 154(b) by 877 days.

(21) Appl. No.: 11/472,928

(22) Filed: Jun. 22, 2006

(65) Prior Publication Data

US 2007/0299977 A1  Dec. 27, 2007

(51) Int. Cl.
*G06F 15/173* (2006.01)
(52) U.S. Cl. ...................................................... 709/223
(58) Field of Classification Search ................. 709/223, 709/224
See application file for complete search history.

(56) References Cited

U.S. PATENT DOCUMENTS

| 6,167,405 | A | 12/2000 | Rosensteel, Jr. et al. |
| 6,999,956 | B2 | 2/2006 | Mullins |
| 7,290,244 | B2 * | 10/2007 | Peck et al. ................. 717/109 |
| 2002/0046221 | A1 | 4/2002 | Wallace et al. |
| 2002/0091702 | A1 | 7/2002 | Mullins |
| 2003/0023518 | A1 | 1/2003 | Spriggs et al. |
| 2003/0163298 | A1 | 8/2003 | Odom et al. |
| 2004/0044793 | A1 | 3/2004 | Pauly et al. |
| 2005/0165881 | A1 | 7/2005 | Brooks et al. |
| 2005/0223035 | A1 * | 10/2005 | Shin et al. ................. 707/104.1 |
| 2006/0236225 | A1 | 10/2006 | Achilles et al. |
| 2007/0055643 | A1 | 3/2007 | Iwatsu et al. |
| 2009/0080013 | A1 * | 3/2009 | Sato et al. .................. 358/1.15 |

OTHER PUBLICATIONS

"CIM Tutorial"; Distributed Management Task Force, Inc. and WBEM Solutions, Inc.; www.wbernsolutions.com/tuitorials/CIM/; 2003; (105 pages).

* cited by examiner

*Primary Examiner*—Aaron Strange
*Assistant Examiner*—Ebrahim Golabbakhsh
(74) *Attorney, Agent, or Firm*—Osha•Liang LLP

(57) ABSTRACT

A method for managing an asset that includes identifying a relative location of a scheme, wherein the scheme is used to manage the asset, creating a relative Uniform Resource Identifier (URI) using the relative location, wherein the relative URI that includes at least one variable, and creating an entry in a native access interface definition, wherein the entry that includes the relative URI, wherein the native asset interface definition is bound to a data acquisition (DAQ) definition, and wherein the DAQ definition is an interface between a protocol handler and an information model, wherein managing the asset is performed using an actual URI to obtain management information, wherein the actual URI is obtained by replacing the at least one variable of the relative URI, and wherein the management information is transmitted to a management application.

16 Claims, 6 Drawing Sheets

USE OF URI-SPECIFICATIONS IN META-DATA DRIVEN INSTRUMENTATION

CROSS-REFERENCE TO RELATED APPLICATIONS

The present application contains subject matter that may be related to the subject matter in the following U.S. patent applications, which are all assigned to a common assignee: "System and Method for Meta-data Driven Instrumentation" Ser. No. 11/472,614 filed on Jun. 22, 2006; "Resource Discovery and Enumeration in the Meta-Data Driven Instrumentation" Ser. No. 11/473,098 filed on Jun. 22, 2006; "System and Method for Object-Oriented Meta-Data Driven instrumentation" Ser. No. 11/473,099 filed on Jun. 22, 2006; "System and Method for Native-Asset-Interface Libraries for Instrumentation" Ser. No. 11/472,852 filed on Jun. 22, 2006; "Asynchronous Events in Meta-Data Driven Instrumentation" Ser. No. 11/473,100 filed on Jun. 22, 2006; "System and Method for Efficient Meta-Data Driven Instrumentation" Ser. No. 11/472,660 filed on Jun. 22, 2006; and "System and Method for Mapping between Instrumentation and Information Model" Ser. No. 11/473,197 filed on Jun. 22, 2006.

BACKGROUND

A network corresponds to an interconnection of more than one computer system. For example, one type of network is a home network. A home network may correspond to two or more personal computers that can exchange data with each other and the Internet. Different types of networks exist throughout society. For example, large organizations often have data centers, servers, and various personal computer systems to exchange information between users, and to provide processing power to a single user.

In order to provide such functionality, a network includes various types of hardware and software. For example, the hardware includes the computer systems (personal computers, servers, and other such computing devices), network interface hardware, interconnection mediums (e.g., cables, wireless signals, etc.) routers, switches, hubs, and other such hardware. The software is instructions for providing the functionality of the network. For example, the software may include operating systems, network specific applications, user applications, server applications, etc.

In order to keep a network operating properly, the network must be managed. Managing a network involves managing the different resources (i.e., hardware and software) of the network. Typically, a resource can be managed through an application programming interface (API) of the resource. An application programming interface is the interface that a resource provides in order to allow management requests for service and management data to be made of the resource by management applications. Specifically, a management application that has knowledge of the application programming interface of the resource can manage the resource by accessing the different functions and data available through the application programming interface of the resource.

SUMMARY

In general, in one aspect, the invention relates to a method for managing an asset that includes identifying a relative location of a scheme, wherein the scheme is used to manage the asset, creating a relative Uniform Resource Identifier (URI) using the relative location, wherein the relative URI that includes at least one variable, and creating an entry in a native access interface definition, wherein the entry that includes the relative URI, wherein the native asset interface definition is bound to a data acquisition (DAQ) definition, and wherein the DAQ definition is an interface between a protocol handler and an information model, wherein managing the asset is performed using an actual URI to obtain management information, wherein the actual URI is obtained by replacing the at least one variable of the relative URI, and wherein the management information is transmitted to a management application.

In general, in one aspect, the invention relates to a system for providing asset management for managing an asset that includes a native asset interface definition that includes a relative Uniform Resource Identifier (URI) for a scheme, wherein the scheme is used to manage the asset, wherein the relative URI identifies a relative location of the scheme, and wherein the relative URI that includes at least one variable, and a data acquisition manager configured to replace at runtime the at least one variable of the relative URI to obtain the actual URI, manage the asset using the actual URI to obtain management information, and transmit the management information to a management application.

In general, in one aspect, the invention relates to a data structure for managing an asset that includes a first element that includes a variable, a second element a relative location of a scheme for managing the asset, wherein a concatenation of the first element and the second element create a relative URI, wherein the variable is replaced at runtime to obtain the actual URI, and wherein the actual URI is used to manage the asset to obtain management information, and wherein the management information is transmitted to a management application.

Other aspects of the invention will be apparent from the following description and the appended claims.

DETAILED DESCRIPTION

Figure 1:
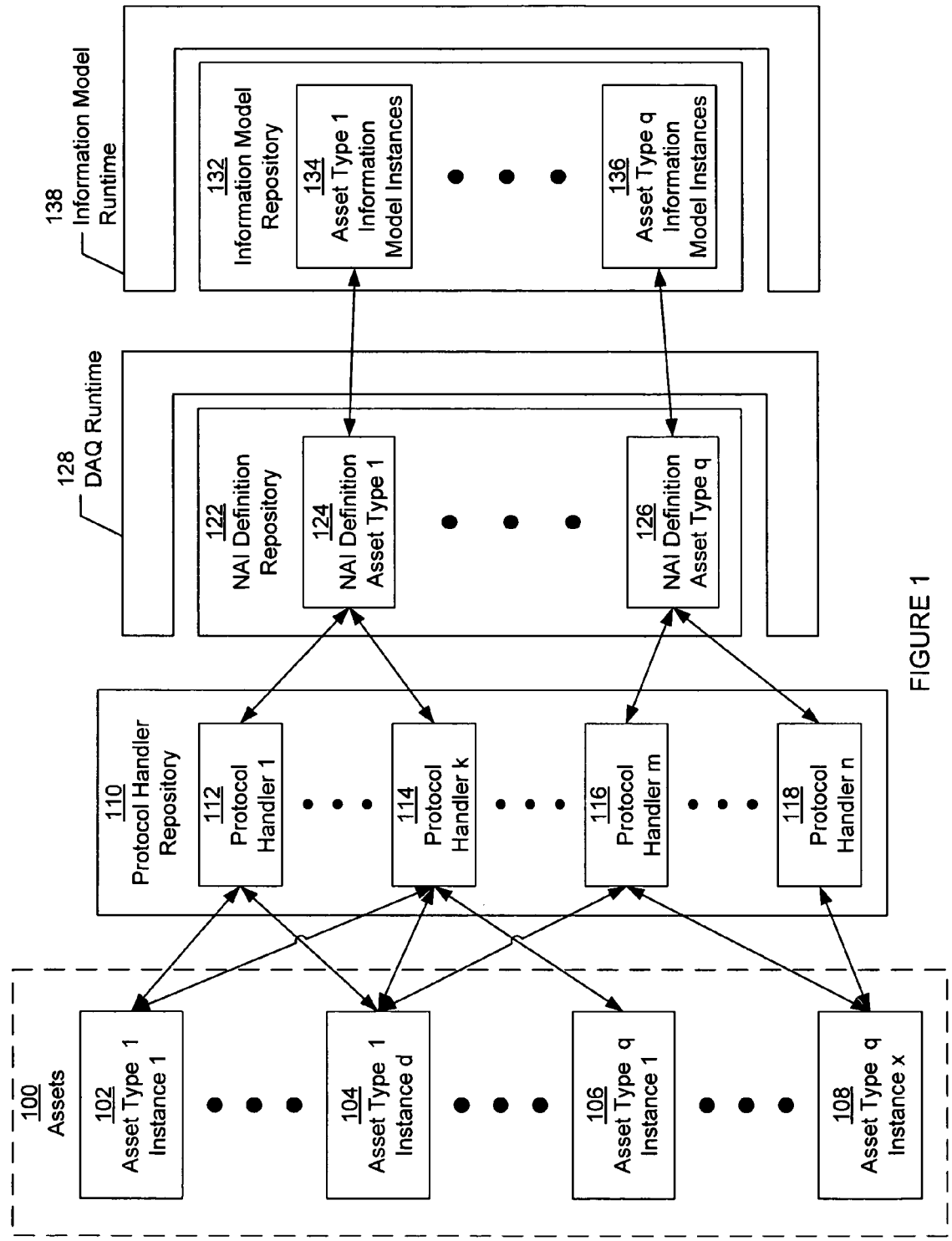
FIG. 1 shows a schematic diagram of a system for managing assets in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and apparatus for managing assets. Specifically, embodiments of the invention provide a mechanism for managing assets of different asset types through a common interface. Managing an asset includes monitoring the asset, actively managing the asset, registering the asset, or performing any other function on the asset. More specifically, embodiments of the invention abstract the application programming interface from the management data and functionality associated with a single asset. Using the abstraction, a management application and information model can manage an asset without knowing the application programming interface of the asset.

Moreover, when defining the abstraction of the application programming interface, embodiments of the invention use relative uniform resource identifiers (URIs). In one or more embodiments of the invention, a relative URI identifies an API relative to a portion of the system.

FIG. 1 shows a schematic diagram of a system for managing assets in accordance with one or more embodiments of the invention. As shown in FIG. 1, the system includes assets (100), a protocol handler repository (110), a native asset interface (NAI) definition repository (122), a data acquisition (DAQ) runtime (128), an information model repository (132), and an information model runtime (138) in accordance with one or more embodiments of the invention. Each of these components is described below.

An asset (100) corresponds to any type of actual manageable resource in accordance with one or more embodiments of the invention. Specifically, asset (100) corresponds to the resources that are the object of the management. For example, an asset may correspond to software (e.g., operating system, database application, network application, or any other type of software) or hardware (e.g., computer systems, routers, switches, etc.).

One attribute of an asset (100) is the location of the asset (not shown) in accordance with one or more embodiments of the invention. A location corresponds to the path of the asset. For example, a location may specify that the asset can be identified by a specific host name that has the asset. The location may be defined with respect to a network, including subnets, the name of the asset, etc.

Another attribute of an asset (100) corresponds to the asset type. An asset type specifies a group of characteristics of the asset. The asset type may specify a type of operating system, a type of hardware, a type of server, etc. For example, if the asset is an operating system, then the asset type for the asset may correspond to a particular operating system, such as Solaris™ developed by Sun Microsystems, Inc. (a trademark of Sun Microsystems, Inc. located in Santa Clara, Calif.). In one or more embodiments of the invention, assets that have the attribute of the same asset type have the same native asset interface (NAI) for managing the resources of the asset.

An NAI corresponds to a collection of instrumentation and control interfaces that is provided by the asset for the purposes of managing the asset. For example, an NAI may correspond to command line programs, files, simple network management protocol (SNMP), Intelligent Platform Management Interface (IPMI), etc.

An asset type may have one or more instances (e.g., asset type 1/instance 1 (102), asset type 1/instance d (104), asset type q/instance 1 (106), asset type q /instance x (108)) of the asset type. In particular, assets that are of the same asset type are called instances of the asset type. For example, as shown in FIG. 1, asset type 1 has at least two instances (e.g., asset type 1/instance 1 (102) and asset type 1/instance d (104)), while asset type q has at least two separate instances (e.g., asset type q/instance 1 (106) and asset type q/instance x (108)).

Continuing with FIG. 1, the system also includes a protocol handler repository (110) in accordance with one or more embodiments of the invention. A protocol hander repository (110) corresponds to a storage unit, such as a file system or library, for protocol handlers (e.g., protocol handler 1 (112), protocol handler k (114), protocol handler m (116), protocol handler n (118)). A protocol handler (e.g., protocol handler 1 (112), protocol handler k (114), protocol handler m (116), protocol handler n (118)) corresponds to a logical component that includes functionality to directly access the data, methods, and functions of an asset (100). Specifically, the protocol handler (e.g., protocol handler 1 (112), protocol handler k (114), protocol handler m (116), protocol handler n (118) includes functionality to use the NAI of the asset in order to manage the asset.

In one or more embodiments of the invention, each protocol handler (e.g., protocol handler 1 (112), protocol handler k (114), protocol handler m (116), protocol handler n (118)) is designed for a single protocol or NAI. For example, one protocol handler (e.g., protocol handler 1 (112), protocol handler k (114), protocol handler m (116), protocol handler n (118)) may include functionality to manage assets that use the SNMP, another protocol handler may be designed for IPMI, while another protocol handler may be designed for assets that are managed Integrated Light Out Management (ILOM) developed by Sun Microsystems, Inc., and another protocol handler may manage assets that use the Network Time Protocol (NTP). In one or more embodiments of the invention, only one protocol handler exists for any single protocol. Those skilled in the art will appreciate that multiple protocol handlers may exist for any single protocol for redundancy purposes.

Because the protocol handlers are associated with a single protocol, each protocol handler (e.g., protocol handler 1 (112), protocol handler k (114), protocol handler m (116), protocol handler n (118)) is connected to one or more asset instance (e.g., asset type 1/instance 1 (102), asset type 1/instance d (104), asset type q/instance 1 (106), asset type q/instance x (108)) in accordance with one or more embodiments of the invention. Specifically, assets (100) that have at least one common NAI are connected to the same protocol handler regardless of whether the assets are of the same asset type.

Similarly, each asset instance (e.g., asset type 1/instance 1 (102), asset type 1/instance d (104), asset type q/instance 1 (106), asset type q/instance x (108)) is connected to one or more protocol handlers (e.g., protocol handler 1 (112), protocol handler k (114), protocol handler m (116), protocol handler n (118)) in accordance with one or more embodiments of the invention. Specifically, each asset instance (e.g., asset type 1/instance 1 (102), asset type 1/instance d (104), asset type q/instance 1 (106), asset type q/instance x (108)) may be accessed by one or more protocol handlers (e.g., protocol handler 1 (112), protocol handler k (114), protocol handler m (116), protocol handler n (118)) that correspond to the protocols for managing the asset.

In addition to the protocol handler repository (110), the system includes a NAI definition repository (122). A NAI definition repository (122) corresponds to a storage unit, such as a library or file system, for NAI definitions (e.g., NAI definition asset type 1 (124), NAI asset type q (126)). An NAI definition (e.g., NAI definition asset type 1 (124), NAI asset type q (126)) corresponds to an abstraction of the management components of an asset in accordance with one or more embodiments of the invention. Specifically, an NAI definition stipulates how data acquisition is performed and how data is populated for access. Moreover, an NAI definition (e.g., NAI definition asset type 1 (124), NAI asset type q (126)) provides a common interface for defining the manageable components of the different assets. In one or more embodiments of the invention, each asset type has a single NAI definition (e.g., NAI definition asset type 1 (124), NAI asset type q (126)). Accordingly, the same NAI asset type definition may be used for multiple asset instances of the same asset type.

A data acquisition (DAQ) runtime (128) corresponds to logical component that includes functionality to use a runtime binding of the NAI definition to manage the asset. Moreover, in one or more embodiments of the invention, the DAQ runtime (128) corresponds to the main focus of the system. Specifically, the DAQ runtime includes functionality to operate on NAI definitions (e.g., NAI definition asset type 1 (124), NAI asset type q (126)). The DAQ runtime (128), and the NAI definitions (e.g., NAI definition asset type 1 (124), NAI asset type q (126)) are described in more detail in FIG. 3.

Continuing with FIG. 1, the NAI definitions (e.g., NAI definition asset type 1 (124), NAI asset type q (126)) are connected to an information model that includes the information model repository (132) and the information model runtime (138). An information model corresponds to a public interface for assets (100). The information model repository (132) corresponds to a storage unit for information model instances (e.g., asset type 1 information model instances (134), asset type q information model instances (136)). The information model instances (e.g., asset type 1 information model instances (134), asset type q information model instances (136)) are described in more detail in FIG. 2.

Continuing with the information model repository (132) of FIG. 1, the information model runtime (138) includes functionality to provide an execution environment for the information model repository (132). Specifically, the information model runtime (138) corresponds to the classes and methods of the information model during execution.

Figure 2:
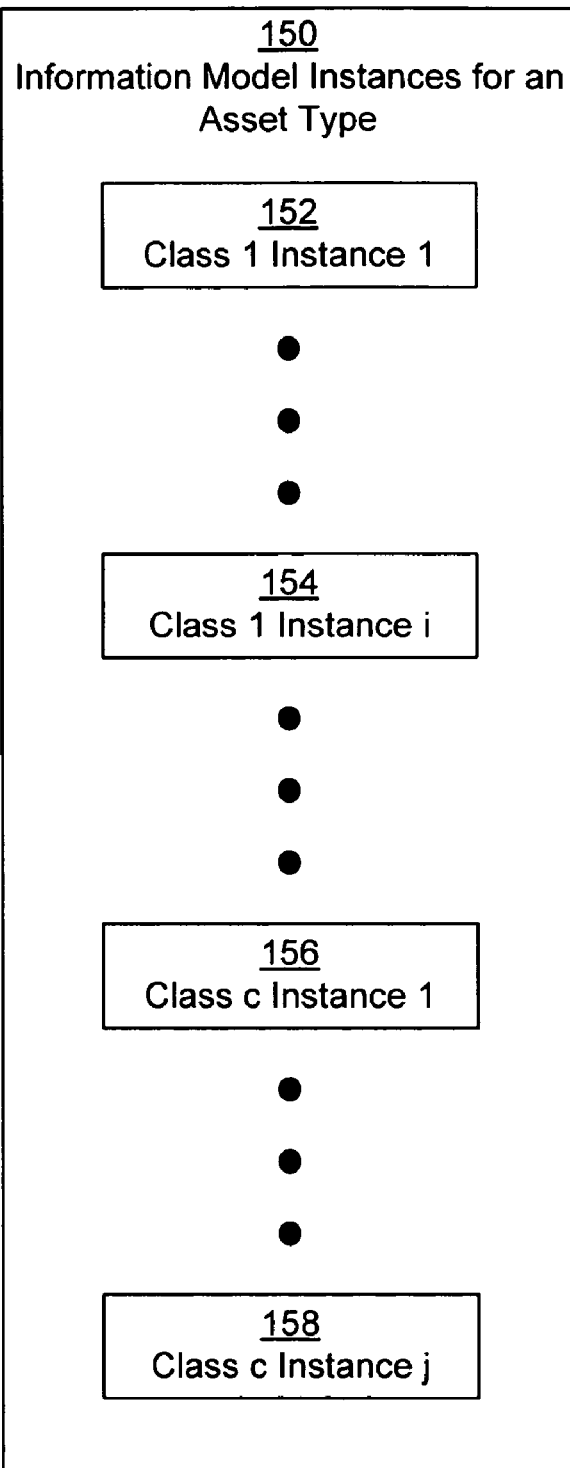
FIG. 2 shows a schematic diagram of information model instances for an asset type in accordance with one or more embodiments of the invention.

FIG. 2 shows a schematic diagram of information model instances for an asset type (150) in accordance with one or more embodiments of the invention. As shown in FIG. 2, each information model for an asset type includes multiple classes. A class corresponds to a collection of methods and properties that are common to a particular kind of component of the asset type. The method corresponds to the methods that can be used for managing an asset. The properties correspond to the manageable variables of an asset. For example, if the asset type is a particular type of server, a class may correspond to properties and methods for managing the operating system component for the particular type of server.

Each class includes multiple class instances (e.g., class 1/instance 1 (152), class 1/instance i (154), class c/instance 1 (156), class c/instance j (158)) in accordance with one or more embodiments of the invention. A class instance (e.g., class 1/instance 1 (152), class 1/instance i (154), class c/instance 1 (156), class c/instance j (158)) corresponds to an abstraction of an asset type instance in information model format. In one or more embodiments of the invention, the information model format corresponds to common information model (CIM) format (developed by Distributed Management Task Force, Inc. located in Portland, Oreg.). As shown in FIG. 2, the class instances (e.g., class 1/instance 1 (152), class 1/instance i (154), class c/instance 1 (156), class c/instance j (158)) for the information model may not be in a one to one relationship with the instances of the asset type for the class. In particular, some asset type instances may not have a corresponding instance for a particular information model class.

Each information model class instance (e.g., class 1/instance 1 (152), class 1/instance i (154), class c/instance 1 (156), class c/instance j (158)) is connected to a mapping specification (not shown) in accordance with one or more embodiments of the invention. The mapping specification includes functionality to map between the information model format and the DAQ format of the DAQ runtime. Accordingly, an information model class instance (e.g., class 1/instance 1 (152), class 1/instance i (154), class c/instance 1 (156), class c/instance j (158)) can manage virtually any asset without knowledge of the specific protocols used to manage the asset.

Alternatively, in one or more embodiments of the invention, each information model class instance (e.g., class 1/instance 1 (152), class 1/instance i (154), class c/instance 1 (156), class c/instance j (158)) may include the information required to format communication in the DAQ format in order to directly communicate with the DAQ runtime in accordance with one or more embodiments of the invention.

Figure 3:
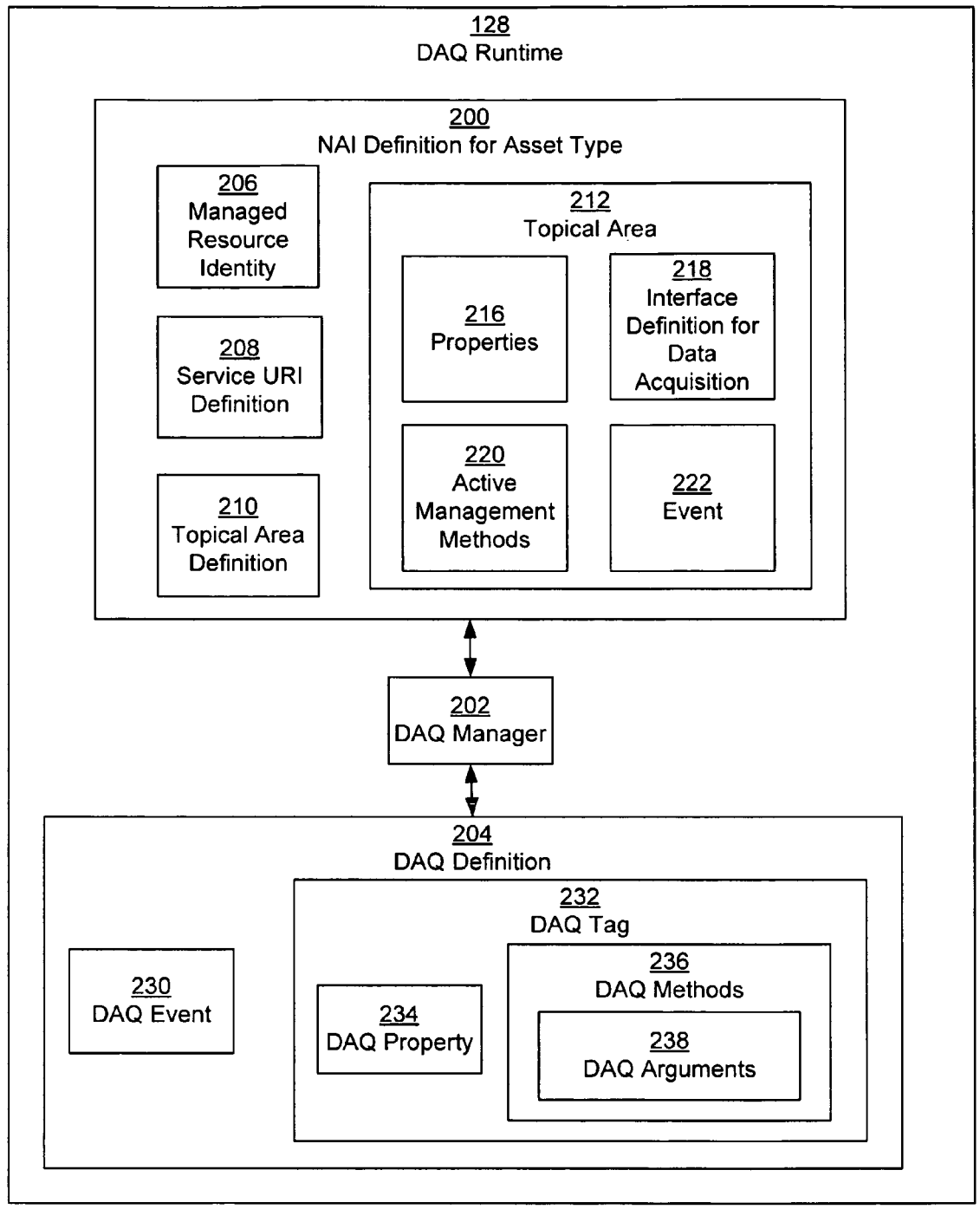
FIG. 3 shows a schematic diagram of a data acquisition runtime used for managing assets in accordance with one or more embodiments of the invention.

FIG. 3 shows a schematic diagram of a DAQ runtime (128) used for managing assets in accordance with one or more embodiments of the invention. As shown in FIG. 3, the DAQ runtime (128) includes an NAI definition for the asset type (200), a DAQ manager (202) and a DAQ definition (204) in accordance with one or more embodiments of the invention. Each of these components is described below.

An NAI definition for an asset type (200) corresponds to a description of the NAI for the asset. Specifically, for each manageable component of the asset type, the NAI definition exists that defines how to manage the component using the NAI of the component. In one or more embodiments of the invention, each NAI definition corresponds to a URI. The URI of the NAI definition includes a scheme or protocol (e.g., SNMP, IPMI, etc.), and a part that defines how to execute the NAI in context of the protocol. For example, suppose that information about a computer system are gathered by a command line command "uname-a." Then the NAI definition may specify that the protocol is a shell, the location of the computer system, and the command "uname-a." Thus, in the example, the URI may correspond to "sh://localhost/usr/bin/uname?-a." As shown in the example, sh defines the shell protocol, localhost defines the computer system, and "/usr/bin/uname?-a" defines how to obtain the information in the context of the protocol.

In one or more embodiments of the invention, each NAI definition corresponds to a relative URI. A relative URI corresponds to a URI that includes variables for defining the location of the asset. Specifically, rather than requiring that when the asset types are added to the DAQ, information about the location of different asset instances (described above) are known, the location can be represented in variables. Accordingly, a developer can create the NAI definition for the asset type without having to know the actual asset instances, network topology, or configuration of the network.

In one or more embodiments of the invention, the NAI definition for the asset type (200) is defined using extensible markup language (XML). Specifically, the aforementioned components of the NAI definition are denoted by XML tags. Moreover, in one or more embodiments of the invention, the NAI definition complies with a predefined XML schema. The NAI definition for the asset type (200) includes a managed resource identity (206), a service URI definition (208), a topical area definition (210), and a topical area (212). Each of these components is described below.

The managed resource identity (206) corresponds to a definition of the asset type. Specifically, the managed resource identity (206) uniquely identifies the asset type in the NAI repository (not shown). In one or more embodiments of the invention, the managed resource identity (206) corresponds to an alpha-numeric identifier.

In addition to the managed resource identity (206), the NAI definition for the asset type (200) includes a service URI definition (208). The service URI definition (208) denotes how instances of the asset are enumerated. Specifically, the service URI definition (208) defines the scheme and method for identifying all instances of the asset type. For example, the service URI definition (208) may specify an enumeration service, a database, a discovery protocol, or any other mechanism for enumerating instances of an asset type.

The NAI definition for the asset type (200) also includes a topical area definition (210) in accordance with one or more embodiments of the invention. A topical area definition (210) identifies the different topical areas that can be managed for an asset type. For example, if the asset type is a computer system, then the topical area definition (210) may specify that the different manageable components of the asset type or topical areas of the asset type. For example, the topical areas may correspond to operating system, storage, networking, executing processes, or other such area.

In accordance with one or more embodiments of the invention, each topical area includes a topical area definition (212). The topical area definition (212) corresponds to a specification for managing the topical area. The topical area definition (212) includes properties (216), interface definitions for data acquisition (218), active management methods (220), and events (222). Each of these components is described below.

Properties (216) correspond to the information in the topical area about the asset type. Specifically, a property (216) corresponds to the information and data that can be set and obtained from an asset. For example, if the topical area corresponds to storage, then the properties may correspond to storage space, partitioning, amount of used space, etc. In one or more embodiments of the invention, the name of a property is unique within the namespace of the topical area. Further, in one or more embodiments of the invention, each property (216) includes a plurality of attributes. For example, the attributes of the property (216) may correspond to the name, a description, whether the property is able to be changed, the data type of values of the property, etc.

The interface definition for data acquisition (218) identifies how the properties (216) are populated in accordance with one or more embodiments of the invention. Specifically, the interface definition for data acquisition (218) specifies the scheme and method in the context of the scheme that is used to manage the asset in relation to the property. For example, the interface definition for data acquisition may correspond to snmp://target@host:port/1.3.6.2.1.1.1.\*. The SNMP portion shows the scheme that is used to obtain a property as required by the NAI for the property is SNMP. The remainder portion of the example interface definition corresponds to the location for obtaining and setting the property on the asset. Also, in the example interface, "target" and "host" identify variables for locating the property. Accordingly, the snmp://target@host:port/1.3.6.2.1.1.1.\*. corresponds to a relative URI for the data acquisition in accordance with one or more embodiments of the invention.

Continuing with FIG. 3, the topical area definition (212) also includes active management methods (220). The active management methods (220) correspond to information about the methods that the NAI for the asset type provides in order to manage the asset by modification. For example, a method from the NAI may correspond to reset a particular value. The active management methods (220) identify how the value is reset. In one or more embodiment of the invention, active management methods (220) provide information for invoking the method for the NAI of the asset type.

Another component of the topical area definition (212) is an event (222). An event (222) corresponds to information for subscribing for notifications. Specifically, the NAI for the asset type generally includes mechanisms for receiving periodic notifications or only notification of changes. An event (222) corresponds to the definition of how to turn on the NAI for the notifications. For example, an event (222) may correspond to information about how to register for information about temperature.

In addition to the NAI definition for the asset type (200), the DAQ runtime (128) includes a DAQ definition (204) in accordance with one or more embodiments of the invention. A DAQ definition (204) corresponds to a runtime image of the NAI definition for the asset type (200). Specifically, the DAQ definition (204) corresponds to a runtime binding of the NAI definition for the asset type (200). For example, whereas in one or more embodiments of the invention, the NAI definition for the asset type (200) is in XML language, the DAQ definition (204) may correspond to an object oriented programming language. More specifically, a binding compiler (not shown) includes functionality to translate XML schema into one or more Java™ classes without requiring the developer to write complex parsing code. Moreover, in one or more embodiments of the invention, each DAQ definition (204) has the same names for the methods regardless of the different NAI definitions. Accordingly, the DAQ definition provides a common interface for each of the different asset types of the NAI definitions.

Further, the DAQ definition (204) may include the relative URIs identified in the NAI or corresponding actual URIs. An actual URI corresponds to a URI that identifies the actual location of the resource. Specifically, an actual URI corresponds to a relative URI that no longer contains variables.

In accordance with one or more embodiments of the invention, the DAQ definition (204) includes a DAQ event (230) and a DAQ tag (232). A DAQ event (230) corresponds to a runtime binding of an event (222). Specifically, a DAQ event (230) includes functionality to compare an old value and new value for a property corresponding to the DAQ event (230). Further, the DAQ event includes functionality to register listeners for the DAQ event (230) and inform registered listeners of a current status (e.g., changes between the old and new value, no change, etc.) of the property associated with the DAQ event (230).

A DAQ tag (232) corresponds to a runtime image of the topical area definition (212). Accordingly, those skilled in the art will appreciate that a DAQ tag (232) exists for each topical area definition (212) in accordance with one or more embodiments of the invention. The DAQ tag (232) includes a DAQ property (234) and DAQ methods (236).

A DAQ property (234) corresponds to a runtime image of the properties definition (216). Similarly, DAQ methods (236) correspond to a runtime image of the active management methods (220). The DAQ methods (236) include DAQ arguments (238). The DAQ arguments (238) correspond to the arguments required by the NAI methods of the asset. For example, if the NAI method for an asset corresponding to storage is to change the partitioning of the storage, then the DAQ arguments for a DAQ method of partitioning may specify how the storage devised is partitioned.

Interposed between the DAQ definition (204) and the NAI definition for an asset type (200) is a DAQ manager (202). The DAQ manager (202) corresponds to a logical engine that includes functionality to perform a runtime binding of the NAI definition for the asset type (200) with the DAQ definition (204) in accordance with one or more embodiments of the invention. Further, the DAQ manager (202) includes functionality to identify the DAQ definition (204) for a given management request and trigger the operations required using the DAQ definition (204) for managing the asset according to the management request.

For example, in one exemplary implementation of one or more embodiments of the invention, the DAQ runtime includes functionality to process request of type get attributes, set attributes, invoke methods, and manage event subscription requests. Further, in one or more embodiments of the invention, the DAQ runtime includes functionality to obtain information about enumerated instances of an asset type using an enumeration URI. Using the information about the enumerated instances, the DAQ runtime includes functionality to replace variables in the relative URI to obtain the actual URI for a specific enumerated instance. Those skilled in the art will appreciate that the replacement of the variables may be at any time after the information about the enumerated instance is obtained and the relative URI for the request is set. Thus, the URIs obtained in the processing of aforementioned requests may be actual URIs or relative URIs. The DAQ runtime processing of the requests in the exemplary implementation is described below.

In one or more embodiments of the invention, in response to a get attribute request the runtime includes functionality to perform the following. Specifically, in response to the get attribute request, the runtime includes functionality to determine the DAQ tag where the attribute of interest is located by accessing the DAQ definition associated with the asset. The DAQ definition can be located via the assets NAI specification document, which is bound at execution time into the DAQ definition object. Next, the runtime includes functionality to obtain from the DAQ definition object the URI associated with the DAQ tag in accordance with one or more embodiments of the invention. Specifically, the DAQ tag includes the URI definition for the obtaining value of the attribute from the NAI of the asset in accordance with one or more embodiments of the invention. After obtaining the necessary information for identifying the NAI for the asset, the runtime includes functionality to query the protocol handler repository to obtain the protocol handler that corresponds to the URI associated with the DAQ tag in accordance with one or more embodiments of the invention. Finally, the runtime includes functionality to perform an invocation of the protocol handler to obtain the value of the required attribute.

Continuing with the example, in one or more embodiments of the invention, in response to a set attribute request the runtime includes functionality to perform the following. Specifically, in response to the set attribute request, the DAQ runtime includes functionality to determine the location of the DAQ tag for setting the attribute of interest. Determining the location may be performed by accessing the DAQ definition object associated with the asset in accordance with one or more embodiments of the invention. Next, the DAQ runtime includes functionality to obtain the URI associated with the DAQ tag from the DAQ definition object for the attribute in accordance with one or more embodiments of the invention. After obtaining the necessary information to set the attribute, the DAQ runtime includes functionality to query the protocol handler repository to obtain the protocol handler that corresponds to the URI associated with the DAQ tag in accordance with one or more embodiments of the invention. Finally, the DAQ runtime performs invocations of the protocol handler found in the library to set the attribute with the requested value.

Continuing with the example, in one or more embodiments of the invention, in response to an invoke method request the runtime includes functionality to perform the following. Specifically, in response to the invoke method request, the DAQ runtime includes functionality to determine the DAQ tag where the method of interest is located by accessing the DAQ definition associated with the asset. After determining the DAQ tag, the DAQ runtime includes functionality to obtain the URI associated with the method to be invoked from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a method invocation operation on the protocol handler that executes the API for the method to be invoked.

Lastly in the example implementation, when the DAQ runtime receives an event subscription request, the DAQ runtime includes functionality to determine the DAQ tag for the subscription event of interest is located by accessing the DAQ definition associated with the asset. After determining the DAQ tag, the DAQ runtime includes functionality to obtain the URI associated with the DAQ tag from the DAQ definition object in accordance with one or more embodiments of the invention. Once the necessary information to invoke the method is obtained, the DAQ runtime includes functionality to query the protocol handler repository to obtain the protocol handler that corresponds to the URI associated with the DAQ tag in accordance with one or more embodiments of the invention. Finally, the DAQ runtime includes functionality to perform a subscription request operation using the protocol handler to obtain notification of events through the NAI of the asset.

As shown in the above example, the common interface through the DAQ allows for an information model to perform virtually any management functions on the asset that are exposed through the NAI of the asset without having the NAI of the asset in accordance with one or more embodiments of the invention. Specifically, using the aforementioned requests, virtually any management operation can be performed in accordance with one or more embodiments of the invention.

Figure 4:
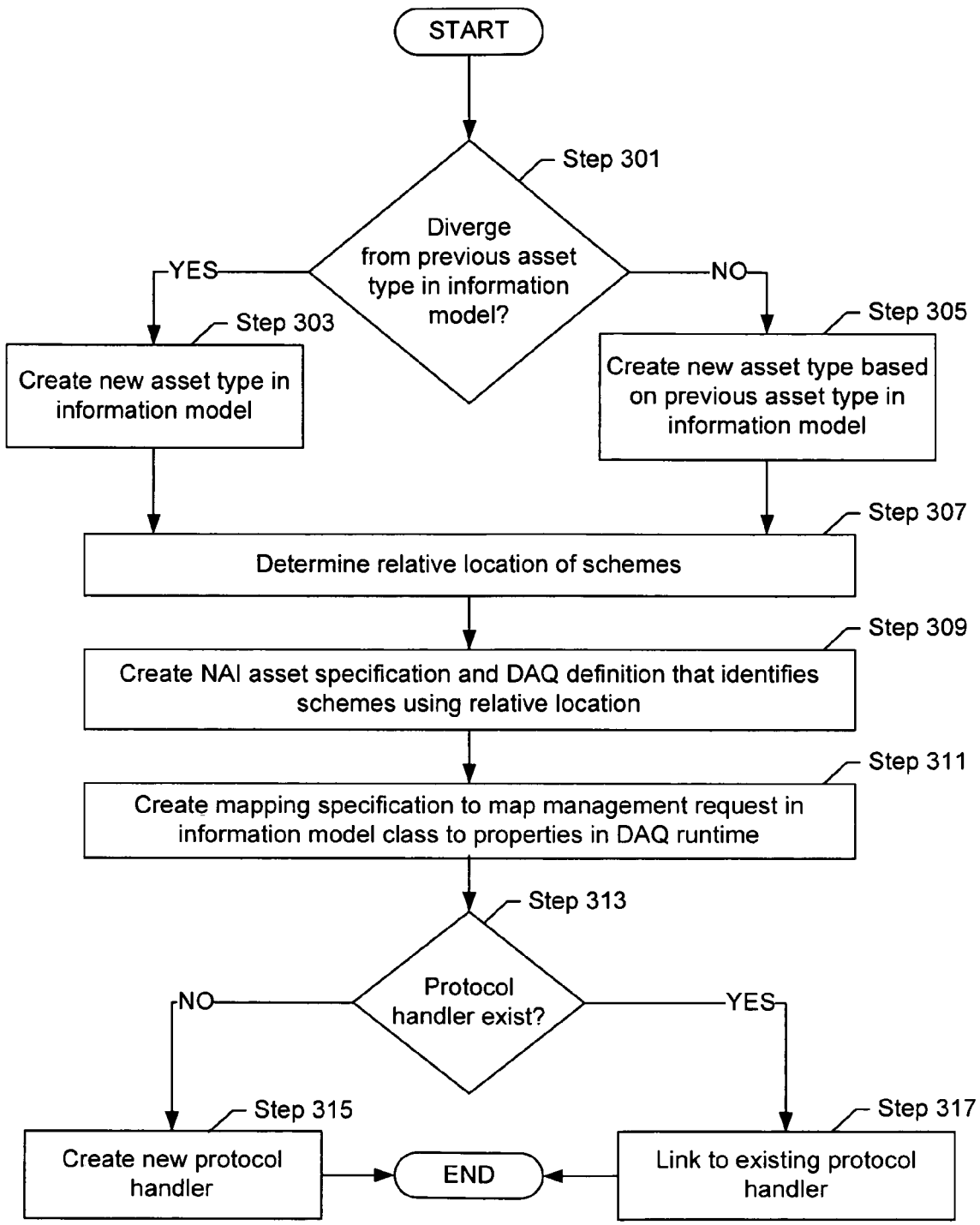
FIG. 4 shows a flowchart of a method for adding a new asset type to the system in accordance with one or more embodiments of the invention.

Also, using the DAQ runtime and the DAQ manager, new assets can be easily added to the system regardless of whether the new assets correspond to a preexisting asset type. If the new asset is of a preexisting asset type, then a new instance of the information model classes for the asset are created and information about the new asset instance is added to the DAQ. Alternatively, if the new asset is of a new asset type, then the system is configured to include the new asset type. FIG. 4 shows a flowchart of a method for adding a new asset type to the system in accordance with one or more embodiments of the invention.

Initially, a determination is made whether the new asset type diverges from a previous asset type in the information model (Step 301). A new asset type diverges from a previous asset type if the components of the new asset type (e.g., operating system, hardware, networking, etc.) are different than any existing asset type already defined in the information model in accordance with one or more embodiments of the invention. Determining whether a new asset diverges from a previously existing asset type can be performed by identifying the components of the new asset and comparing the components with the assets already in the information model.

If the new asset diverges from a previous asset type in the information model, then a new asset type is created in the information model (Step 303). Specifically, new classes are developed for managing the new asset of the new asset type.

Alternatively, if the new asset does not diverge from a previously existing asset, then a new asset type can be created from a previously existing asset type in the information model (Step 305). Specifically, any preexisting classes in the information model that can be used as a basis for the new asset type may be copied or inherited into the new classes.

After creating the new asset type, an instance of the newly developed classes is instantiated in the information model (not shown).

At this stage, the relative location of schemes for managing the asset type are determined (Step 307). The relative location of the schemes may be determined by accessing a knowledge-base that contains the information about accessing manageable components of an asset instance. The relative location corresponds to the relative URI for accessing the components in accordance with one or more embodiments of the invention.

Using the relative location of the scheme, an NAI asset specification containing the relative URIs is created (Step 309). Accordingly, the NAI definition is developed. Specifically, for each mechanism for managing the asset, a definition is added to the NAI definition for the asset. More specifically, the tags are identified and the information within the tags is populated using the relative URIs in accordance with one or more embodiments of the invention.

At any stage after creating the NAI definition and before the asset is managed, the DAQ manager may perform the runtime binding of the NAI definition to the DAQ definition. Performing the runtime binding may include, for example, parsing the NAI definition and creating a DAQ definition object for managing the asset using the information in the NAI definition.

In order to enumerate and manage the asset of the new asset type, the information model instance must be link to the NAI definition. Accordingly, the properties from the DAQ tier to populate the information model are determined based on the information model classes. Specifically, the procedures and enumeration mechanisms for populating the information model based on the NAI definition are identified.

Using the identified procedures and enumeration mechanisms, a mapping specification is created to map the properties in the information model class to the properties in the DAQ (Step 311). Creating the mapping specification may include identifying how the components of the information model correlate to the components of the DAQ. The mapping specification may then be created to reflect the correlation between components.

Continuing with FIG. 4, protocol handlers are also associated with the new asset type. Specifically, a determination is made whether the protocol handlers exist for the new asset type (Step 313). Determining whether protocol handlers exist for the new asset can be performed by identifying the relative URIs for the asset type. Because the relative URIs specifies the protocols or schemes that are required for managing the asset type, the protocol for the relative URI can be determined.

If a protocol handler does not exist for the new asset, then a new protocol handler is created (Step 315). Specifically, at this stage, a new protocol handler is developed for the new asset. Developing the protocol handler may include creating any classes or functions for the protocol handler in a programming language in accordance with one or more embodiments of the invention.

Alternatively, if a protocol handler already exists for the asset type, then a link to the protocol handler is created (Step 317). Specifically, the NAI definition in the DAQ runtime links to the protocol handler.

Figure 5:
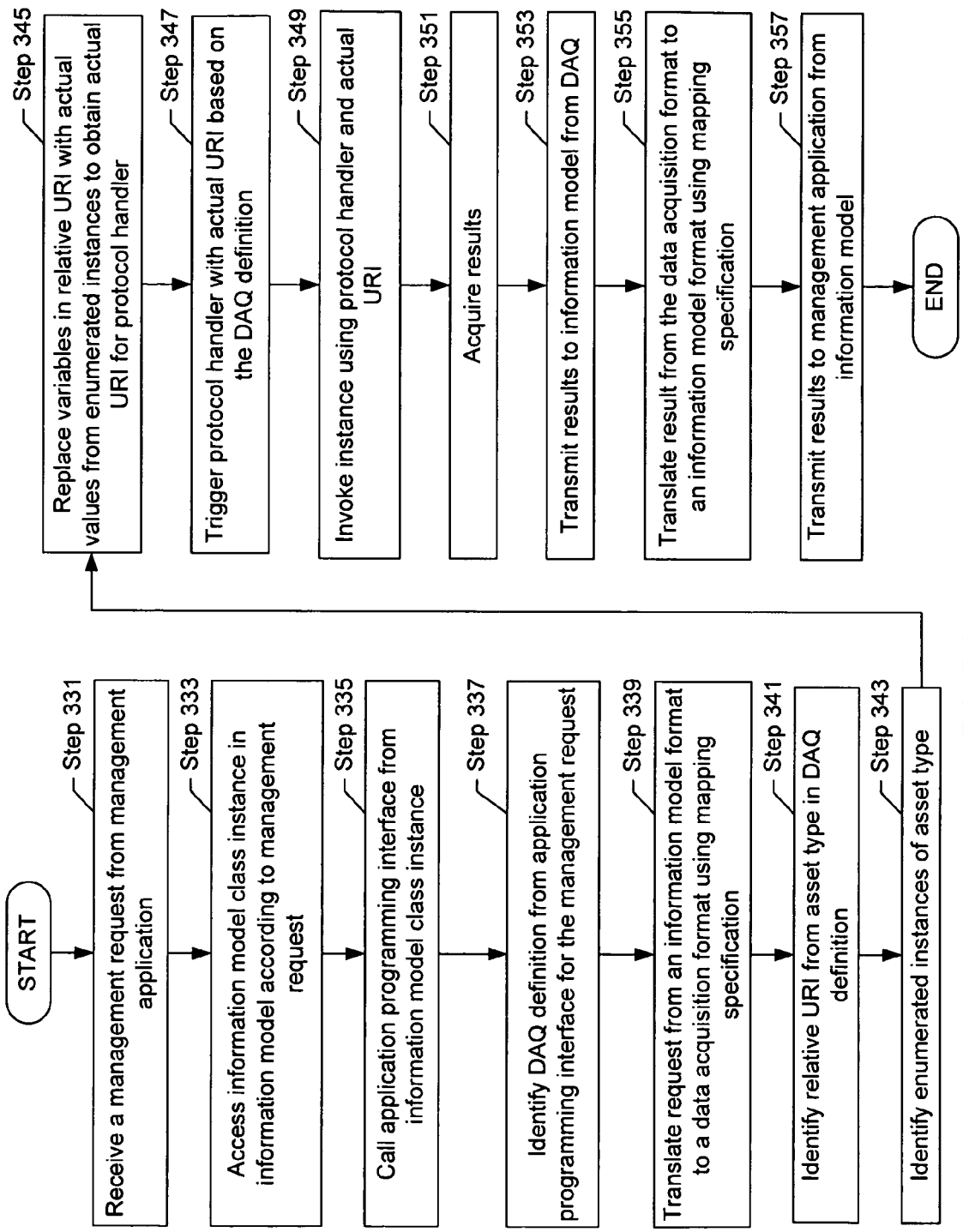
FIG. 5 shows a flowchart of a method for processing a management request in accordance with one or more embodiments of the invention.

Once the mapping specification is created, instances of the information model are added, and the NAI definition is bound to the DAQ definition, the asset can be managed according to management requests. FIG. 5 shows a flowchart of a method for processing a management request in accordance with one or more embodiments of the invention.

Initially, a management request is received from a management application (Step 331). In one or more embodiments of the invention, the management request is received by the information model in information model format. More specifically, the management application submits a query to the information model using the API of the information model.

According to the management request, the information model class instance is accessed in the information model (Step 333). In particular, the management request may include one or more asset identifiers or an asset type identifier. Based on the identifiers and the type of request, information model asset type instance is identified and accessed. At this stage, the information model class instance may be triggered to perform the management function.

By accessing the information model class instance, an API is called from the information model class instance (Step 335). Specifically, the information model class instance includes a call to an API for managing the asset. The API may or may not have any resemblance to the NAI of the asset. In one or more embodiments of the invention, the call to the API is intercepted.

Next, the DAQ definition is identified via the NAI definition that is bound to the DAQ definition from the API for the management request (Step 337). Identifying the DAQ definition may be performed using virtually any technique known in the art. For example, a mapping specification may be queried for the DAQ definition corresponding to the management request. Alternatively, the DAQ manager may determine the type of management request and the asset type of the management request to identify the DAQ definition for the management request.

Once the DAQ definition is identified, the request is translated from the information model format to the data acquisition format using the mapping specification (Step 339). Specifically, the parameters from the request are formatted according to the requirements of the DAQ definition, and the any remaining necessary formatting changes known in the art may be performed. For example, the information model formatted request may be formatted in an information model language. Accordingly, the language of the request may be translated to a format that a DAQ language can understand.

After translating the request, the relative URI is identified from the asset type in the DAQ definition (Step 341). Specifically, the relative URI is obtained from the DAQ.

Also, the enumerated instance of the asset type are identified (Step 343). Specifically, the actual locations or methods for accessing the enumerated instances are determined. More specifically, if the management request only specifies a subset of the instances of the asset type, then the locations or methods for accessing the subset are determined.

Identifying the enumerated instances may be performed by using the service URI specified in the NAI definition. Specifically, because the service URI identifies an enumeration mechanism for the asset type, the DAQ definition that is bound to the service URI may be invoked by the DAQ runtime. Accordingly, the enumerated instances are obtained from the enumeration mechanism. More specifically, information about the enumerated instance, such as identifiers and locations can be obtained. Such information may be stored in the DAQ runtime for use in managing the asset.

Accordingly, using the relative URI, and the information about the enumerated instances, variables in the relative URI are replaced with actual values to obtain the actual URI for the protocol handler (Step 345). Replacing the actual values may be performed separately for each enumerated instance by identifying the type of value required by the variable, such as host name, and substituting the actual value specified in the information received from the enumeration mechanism.

Next, the protocol handler is triggered based on the DAQ definition (Step 347). Specifically, as previously stated, the DAQ definition identifies the protocol handlers and the mechanism for managing the asset using the protocol handlers. Based on the DAQ definition, the protocol handler is triggered with the information about the mechanism for the management. For example, suppose the DAQ definition corresponds to the runtime binding of the following NAI definition snmp://aggie@bevo:port/1.3.6.2.1.1.1.*. In such scenario, the protocol handler associated with the SNMP protocol is invoked with the information to obtain the management information from the location identified by: aggie@bevo:port/1.3.6.2.1.1.1.* in accordance with one or more embodiments of the invention.

Further, triggering the protocol handler may be performed separately for each enumerated instance specified in the management request. Specifically, for each instance specified in the management request, an instance of a protocol handler may be triggered.

Continuing with FIG. 5, an asset instance is invoked using the protocol handler and the actual URI (Step 349). Specifically, the protocol handler uses the NAI that is identified by the NAI definition to invoke the management of the asset instance by the asset. By invoking the asset instance, the asset is managed and results may be acquired (Step 351). The results may correspond to actual management information, such as information about the asset, a success or failure indicator, a change in control (e.g., return control of operations to the DAQ without returning data), etc.

Once the results are acquired, the results are transmitted to the information model from the DAQ (Step 353). Specifically, in one or more embodiments of the invention, the information model class that called the API receives the results. Further, the results may be translated for the DAQ format to the information model format using the mapping specification (Step 355).

At this stage, the result may also be transmitted to the management application from the information model (Step 357). Transmitting the results from the information model format may be performed by a return statement of the information model.

As shown in FIG. 5, by using the DAQ definition and performing the translation, the information models, protocol handlers, and assets can be easily modified without unduly affecting the system. Specifically, the information model does not have to be aware of each NAI of each asset. Accordingly, an asset can be managed by a variety of management requests without having to modify the management application or the information model.

In the following example, consider the case in which the asset type is a unitary computer system that is preinstalled with an operating system entitled, "UnitaryOS." Suppose that the UnitaryOS is designed for corporate computer systems. The UnitaryOS unitary computer system has multiple manageable components and APIs for accessing the manageable components.

In the example, an IT firm manages several clients using the DAQ runtime. While the clients do not have the same topology because of size and requirements, many of the clients use the same asset type. Specifically, when adding a new asset type to one client, the IT firm has found that many of the remaining clients could also use the new asset type.

Consider the case in which the IT firm decides to add the unitary computer system with UnitaryOS. Accordingly, a developer at the IT firm creates an NAI definition for the UnitaryOS. Because, the NAI definition includes relative URIs, the developer is not constrained to know the actual specifics about any client. One of the NAI definitions is to invoke the UnitaryOS to obtain updates. In the example, the relative URI to obtain an update is:

sh://hostname/opt/UnitaryOS/bin/update.exe

Specifically, "sh" identifies the scheme, the "hostname" corresponds to a variable, and the remaining portion specifies how to use the protocol handler to update the unitary system.

After creating the NAI definition, tech consultants at the IT firm install multiple unitary computer system with UnitaryOS at the various clients. Further, the tech consultant add the NAI definition supplied by the IT firm to the NAI definition repository. The DAQ manager for each client binds the NAI definition to the DAQ definition. As shown above, the NAI definition may be created for multiple clients without requiring knowledge of the client.

Continuing with the example, after performing the installation by the information technology consultants, administrators and management applications are responsible for managing the unitary computer systems. Consider the case in which a virus affects the unitary computer systems using UnitaryOS at the client. The software fix for the virus is available by checking for and installing an update. Accordingly, a management application sends a management request to the information model classes. An API at the information model class is invoked and intercepted. The DAQ definition is identified by both the asset type (i.e., a unitary system with UnitaryOS) and the type of management request (i.e., for updates).

At this stage, the DAQ runtime acquires the enumerated instances of the unitary systems. Specifically, the DAQ runtime uses the service URI to invoke a protocol handler for enumeration. The protocol handler uses the service URI to invoke any type of enumeration mechanism as specified by the service URI. The enumeration mechanism returns a list of hostnames for the unitary systems having the UnitaryOS.

Using the definition described above, for each enumerated instance, the variable hostname is replaced with the host name of the enumerated instance. Next, a protocol handler corresponding to 'sh' is triggered for each of the enumerated instances. Suppose that one such host name is "shark2." In such scenario, the protocol handler is triggered with:

sh://shark2/opt/UnitaryOS/bin/update.exe

Thus, the shark2 unitary system with UnitaryOS invokes the update executable to obtain and install the fix for the virus. Once all enumerated instances have installed the virus fix, the virus is no longer on the client.

As shown in the example, a creator of the unitary system and UnitaryOS does not have to conform to requirements when creating the NAI of the asset. Further, when developing the NAI definition, the developer can do so for multiple clients and not have to consider the topology or configuration of the clients. Similarly, an administrator and management application does not have to know explicit information about how the asset is managed.

Figure 6:
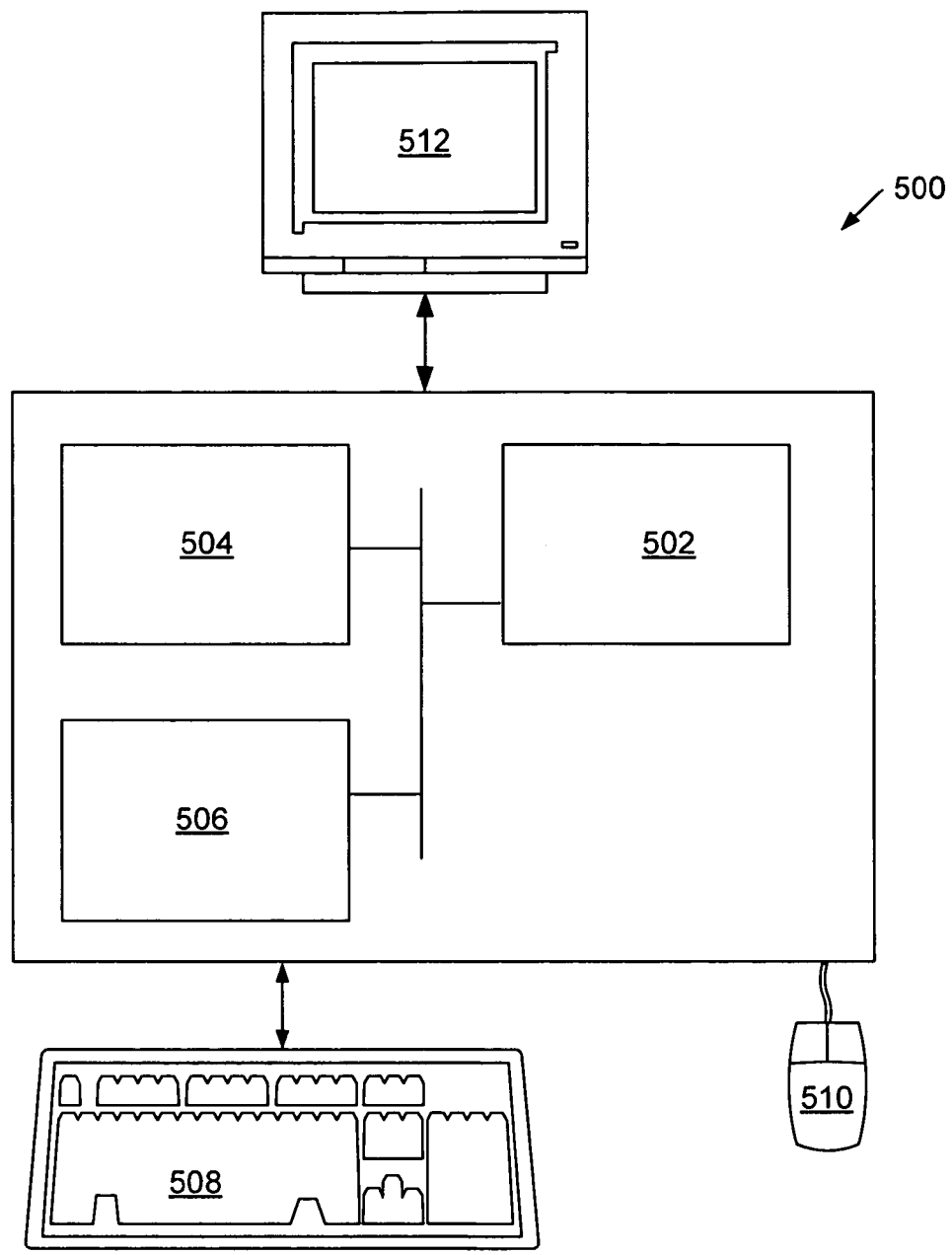
FIG. 6 shows a computer system in accordance with one or more embodiments of the invention.

The invention may be implemented on virtually any type of computer regardless of the platform being used. For example, as shown in FIG. 6, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., NAI definition, DAQ definition, Information model repository, protocol handler repository, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

Embodiments of the invention provide a mechanism for easy management of assets. Specifically, embodiments of the invention minimize the amount of framework code required for managing an asset. For example, by only adding metadata definitions to the DAQ runtime in the form of NAI definitions, new assets of new asset types can be easily added to the system. Specifically, when new assets are added to the system, the information model may only be adjusted to add class information for managing the new asset. The specific protocol information for the new asset and NAI specific methods for managing the asset do not need to be added to the information model. Accordingly, embodiments of the invention reduce the barrier of entry for new products to be instrumented and integrated into systems and network management framework.

Moreover, a creators of assets do not have to conform to requirements when creating the NAI of the asset. Similarly, by using relative URIs the developer can develop an NAI definition and not have to consider the topology or configuration of the network.

Further, by separating the information model and the mechanism for obtaining management information about an asset, multiple information model class instances can obtain management information from the DAQ runtime without constant interruption to the asset. Accordingly, without the interruption, the performance of the asset may increase.

Further, embodiments of the invention provide a mechanism whereby the NAI for the asset can be updated as new technologies are developed without unduly affecting the management infrastructure. Specifically, if a protocol handler exists for the updated NAI, then only the definition needs to change for the asset.

By using relative URIs, the abstraction of the API can be defined without knowing the actual location of the API for each of the asset instances. Thus, in one or more embodiments of the invention, a developer or administrator can define the abstraction without knowing the different layouts of the system.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing an asset comprising:
identifying a relative location of a scheme, wherein the scheme is used to manage the asset, and wherein the relative location is defined with respect to a location of an instance of the asset;
creating a relative Uniform Resource Identifier (URI) comprising the relative location, wherein the relative URI comprises at least one variable and the relative location of the scheme, and wherein the at least one variable is for specifying the location of an instance of the asset;
creating an entry in a native access interface definition, wherein the entry comprises the relative URI;
generating by a computer processor, a data acquisition (DAQ) definition from the native asset interface definition, wherein the DAQ definition is an executable, wherein the DAQ definition comprises the relative URI based on the native asset interface definition comprising the relative URI;
receiving, by a DAQ manager, executing on the computer processor, a management request for managing the asset from the information model;
identifying, by the DAQ manager, executing on the computer processor, based on an asset type of the asset, the DAQ definition corresponding to the asset type;
triggering, by the DAQ manager executing on the computer processor, using the DAQ definition, the protocol handler based on an actual URI and the management request to obtain management information from the instance of the asset, wherein the actual URI is obtained by replacing the at least one variable of the relative URI in the DAQ definition with an address of the location of the instance of the asset, wherein the actual URI comprises the relative location; and
transmitting executing on the computer processor, the management information to a management application.

2. The method of claim 1, wherein replacing the at least one variable is performed at runtime.

3. The method of claim 1, wherein the entry in the native asset interface definition is created by a developer.

4. The method of claim 1, further comprising:
enumerating the instance of the asset to obtain an enumerated instance;
identifying the address of the enumerated instance; and
replacing the at least one variable with the address to obtain the actual URI of the enumerated instance.

5. The method of claim 1, further comprising:
receiving, by an information model, the management request about the asset from the management application.

6. The method of claim 5, wherein the management request is in an information model format.

7. The method of claim 6, further comprising:
translating the management request from the information model format to a DAQ format, wherein the DAQ definition is in the DAQ format.

8. The method of claim 1, wherein the native asset interface definition is in extensible markup language.

9. A computer system for providing asset management for managing an asset comprising:

A computer processor; a native asset interface definition comprising a relative Uniform Resource Identifier (URI) for a scheme,
- wherein the scheme is used to manage the asset,
- wherein the relative URI identifies a relative location of the scheme, wherein the relative location is defined with respect to a location of an instance of the asset, and
- wherein the relative URI comprises at least one variable and the relative location of the scheme, and wherein the at least one variable is for specifying the location of an instance of the asset;

a data acquisition (DAQ) definition generated from the native asset interface definition, wherein the DAQ definition is an executable, and wherein the DAQ definition comprises the relative URI based on the native asset interface definition comprising the relative URI; and a DAQ manager configured to execute on the computer processor configured to:
- replace, at runtime, the at least one variable of the relative URI with an address of the location of the instance of the asset to obtain an actual URI, wherein the actual URI comprises the relative location;
- trigger, using the DAQ definition, a protocol handler based on the actual URI to obtain management information from the instance of the asset; and
- transmit the management information to a management application.

10. The computer system of claim 9, wherein the native asset interface definition is created by a developer.

11. The computer system of claim 9, wherein replacing the at least one variable of the relative URI comprises:
- enumerating the instance of the asset to obtain an enumerated instance;
- identifying the address of the enumerated instance; and
- replacing the at least one variable with the address to obtain actual URI of the enumerated instance.

12. The computer system of claim 9, further comprising:

an information model runtime configured to:
- receive a management request about the asset from the management application; and
- identify the DAQ definition for the management request, wherein triggering the protocol handler is defined by the DAQ definition.

13. The computer system of claim 12, wherein the management request is in an information model format.

14. The computer system of claim 13, wherein the information model runtime is further configured to translate the management request from the information model format to a DAQ format, wherein the DAQ definition is in the DAQ format.

15. The computer system of claim 9, wherein the native asset interface definition is in extensible markup language.

16. A non-transitory computer readable medium comprising computer readable program code embodied therein, which, when executed, causes a computer processor to perform a method, the method comprising identifying a relative location of a scheme, wherein the scheme is used to manage the asset, and wherein the relative location is defined with respect to a location of an instance of the asset;

creating a relative Uniform Resource Identifier (URI) comprising the relative location, wherein the relative URI comprises at least one variable and the relative location of the scheme, and wherein the at least one variable is for specifying the location of an instance of the asset;

creating an entry in a native access interface definition, wherein the entry comprises the relative URI;

generating a data acquisition (DAQ) definition from the native asset interface definition, wherein the DAQ definition is an executable, wherein the DAQ definition comprises the relative URI based on the native asset interface definition comprising the relative URI;

receiving, by a DAQ manager, a management request for managing the asset from the information model;

identifying, by the DAQ manager, based on an asset type of the asset, the DAQ definition corresponding to the asset type;

triggering, by the DAQ manager using the DAQ definition, the protocol handler based on an actual URI and the management request to obtain management information from the instance of the asset, wherein the actual URI is obtained by replacing the at least one variable of the relative URI in the DAQ definition with an address of the location of the instance of the asset, wherein the actual URI comprises the relative location; and transmitting the management information to a management application.

* * * * *

UNITED STATES PATENT AND TRADEMARK OFFICE
CERTIFICATE OF CORRECTION

| | | |
|---|---|---|
| PATENT NO. | : 7,805,507 B2 | Page 1 of 1 |
| APPLICATION NO. | : 11/472928 | |
| DATED | : September 28, 2010 | |
| INVENTOR(S) | : Arieh Markel et al. | |

It is certified that error appears in the above-identified patent and that said Letters Patent is hereby corrected as shown below:

In Claim 1, Column 16 (line 25), a "," should be added after the word "generating".

In Claim 1, Column 16 (line 46), the words "executing on" should be replaced by the word "by".

In Claim 9, Column 17 (line 5), "A" should be lower case.

Claim 9, Column 17 (line 23) should read as "processor and configured to".

Signed and Sealed this
Fifth Day of July, 2011

David J. Kappos
*Director of the United States Patent and Trademark Office*